United States Patent Office 3,376,189
Patented Apr. 2, 1968

3,376,189
METHOD FOR THE PRODUCTION OF A FIRE-RESISTANT MINERAL FIBERBOARD WITH STARCH BINDER
Ernst H. B. Nyström, Skolduagen 21, Djursholm, Sweden
No Drawing. Continuation-in-part of application Ser. No. 562,515, July 5, 1966, which is a continuation-in-part of application Ser. No. 236,717, Nov. 9, 1962. This application Jan. 24, 1967, Ser. No. 611,260
4 Claims. (Cl. 162—152)

ABSTRACT OF THE DISCLOSURE

A fire-resistant, felted, synthetic, mineral fiberboard and method of making the same including mixing mineral synthetic fibers, water and from 6 to 12% of ungelatinized starch to form a 0.4 to 2.5% aqueous suspension of the fibers and the starch; adjusting the pH of the mixture to a value between about 4.2 and 6.9; forming the mixture into a wet matt; cutting the wet matt into sheets; subjecting test sheets of the matt to pressures of varying magnitude to determine at which range of pressure the fibers crush; and applying a pressure below the determined crushing pressure for a period of about 10 to 120 minutes while maintaining a temperature of about 140° to 220° C. to simultaneously dry the matt and effect gelatinization of the starch and thus fixation of the fibers, the pressure during drying being sufficient to produce a dried board having a density between about 0.5 and 1.1 grams per cubic centimeter. When boards manufactured in accordance with this technique are subjected to fire, they will swell at least 25% in volume and usually in excess of 100% of their initial volume.

---

This application is a continuation-in-part of my continuation-in-part application Ser. No. 562,515 which latter is a continuation-in-part of my application Ser. No. 236,717, both of which are now abandoned.

The present invention is concerned with a method for the production of a fire-resistant, felted, synthetic, mineral fiberboard. The board as obtained according to the invention is preferably but not solely intended for use as a building material for covering purposes. In the present specification and annexed claims the term "mineral fibers" is used to denote synthetic fibers produced from such mineral materials as stone, slag or glass, etc., for example according to the known process in which the material is thrown out, in molten form, from a rotatable disc and then introduced in a gas stream where it is fiberized.

Mineral fiberboards are commonly produced by suspending mineral wool, which may have been produced in the manner set forth above, in an aqueous medium while adding an organic binder, which may be starch in a gelatinized or ungelatinized form, cellulose derivatives having binding properties such as methyl cellulose, ethyl cellulose, carboxy-methyl cellulose and hydroxy-ethyl cellulose, urea resins and other synthetic materials such as phenolic resins. The fiber suspension obtained with, if required, other substances commonly used for the manufacture of mineral fiberboards added, is then passed to a so-called wet machine, in which the fiber material is shaped into a web. This so-called wet matt is then carried to a drier, preferably a roller drier, in which the wet matt is dried to effect the fixation of the fibers. Up to now this drying has taken place without applying pressure, so that the final mineral fiberboards had a density nearly always no more than about 0.4 gram per cubic centimeter. Such a mineral fiber-board must be considered to have many good properties, particularly a high thermal insulating property and excellent fire-resistant properties. The disadvantage of the material is, however, that it does not present a sufficiently high mechanical strength to render it utilizable as a surface covering material for all required purposes.

In connection with the present invention, a number of experiments concerning the manufacture of mineral fiberboards has been made. In these experiments there were tested gelatinized starch, ungelatinized starch, methyl cellulose, ethyl cellulose, carboxymethyl cellulose and hydroxyethyl cellulose in an amount of 8 percent by weight of the fibers. A number of sheets cut off from the wet matt, thus having exactly the same properties, were used for the experiments. Each of the sheets was then subjected to drying while pressing to pressures of different values. In this connection, it was surprisingly found that ungelatinized starch proved superior properties as a binder as compared with the other binders tested, in that it remains on the fibers whereas the other binders are removed from the fibers together with the pressing water so that no effective binding of the fibers at low costs can take place.

After fixation of the fibers had taken place, the different sheets as obtained were tested as to binding effect of the different binders. The excellent results with ungelatinized starch were confirmed in that the binding strength of the sheet made by using ungelatinized starch as a binder was superior.

The experiment was then repeated with 8 percent of ungelatinized starch as binder, the bending strength of the fiberboards being determined for varying pressing pressures. The pressing pressure was then plotted as a function of the bending strength in a diagram. This showed that the curve of the function shows a continuous increase of the bending strength to a point characterized by a marked drop for a certain pressing pressure. With respect to the mineral wool tested, produced at the mineral wool factory of Elkem in Norway, a marked change could be observed at an interval of about 6–8 kg./cm.$^2$ of pressing pressure. Boards produced by pressing wet sheets to pressures above this interval showed a relatively low bending strength and also a market brittleness, whereas boards produced by pressing the sheets to pressure values lower than the interval set forth showed a high bending strength.

The density of the products obtained by the pressing was then determined. In this connection, it proved that the density of the mineral fiber-board dried at pressures above the interval of 6–8 kg./cm.$^2$ had a density of approximately 1.2 grams per cubic centimeter, whereas products dried at pressures not more than 6–8 kg./cm.$^2$ had a density amounting to values lower than 1.1 grams per cubic centimeter, usually lower than 1.0 grams per cubic centimeter, but higher than 0.5 grams per cubic centimeter, usually higher than 0.7 grams per cubic centimeter. In analogy to that is known on the manufacture of wood fiberboards, the bending strength should increase when the density increases. In the present case, it has, however, been found, surprisingly enough, that this rule is only true for values up to the interval of 6–8 kg./cm.$^2$ set forth, and that with respect to pressing pressures above this interval a strong decrease of the bending strength will appear, despite the increase of the density. For other mineral wool products, other ranges of pressure in which crushing takes place were found.

On the basis of what has been set forth above, the present invention is concerned with a method for the production of fire-resistant, felted synthetic, mineral fiberboards, which method comprises (a) Mixing synthetic mineral fibers, and water and 6-12% of ungelatinized starch, based on the weight of the fibers, to form an aqueous 0.4 to 2.5% suspension of said fibers and said ungelatinized starch;

(b) Adjusting the pH of the mixture to a value in the range of from about 4.2 to 6.9;

(c) Forming said mixture into a wet matt;

(d) Cutting said wet matt into sheets;

(e) Subjecting test sheets of said mineral fibers to pressures of varying height to determine in which range of pressure fiber crushing takes place; and (f) Applying a pressure below said range of pressure for a period in the range of from 10 to 120 min. by pressing means, the temperature of which being maintained at a value in the range of from 140 to 220° C., while simultaneously drying said matt to effect gelatinization of said starch and thus fixation of said fibers, said pressure being sufficient to produce a dried board having a density of between about 0.5 to 1.1 g. per cc.

The results of the experiments gave the inventor a reason to examine the fiber-boards. In this connection, it proved that in boards produced while using higher pressing pressures than about 6-8 kg./cm.$^2$, the fibers consist of fragments, whereas, in boards produced by using lower pressing pressures, the fibers are held together in a condition of elastic compression which is responsible for the good strength properties. An important property of fiber-boards which have their fibers held together in a condition of elastic compression, is that if subjected to the action of a flame, so that the organic binder ceases to exert its binding function, they will undergo a swelling localized to the spot or spots exposed, which results in an increase of the heat insulating property of the material. The swelling property of the material when subjected to fire will increase for pressing pressures up to 6-8 kg./cm.$^2$ (with respect to mineral wool from Elkem), but will then disappear completely for pressing pressures above this interval. Depending on the compression of the fibres fixed, the swelling is frequently at least about 25 percent and may amount to at least about 50 percent, but it may also be 100 percent or more.

The invention is thus based on the knowledge that pressed mineral fiberboards having their densities within a relatively narrow interval and in which the fibers have not been crushed during the pressing operation, but are held together in a condition of elastic compression, present a combination of excellent fireproof and strength properties. With respect to the latter, the novel products are fully up to what is attained when producing hard wood fiberboards, which must be considered to be extraordinarily surprising, while the fireproof properties are, of course, superior.

When producing fiberboards, it is common practice to add fillers of different kinds, such as kaolin, to the fiber suspension. An addition of such materials will result in an increase of the density over that which would be obtained with the use of a pure mineral fiber material, but the quantities of the added materials which come in question for the manufacture of the boards according to the invention, will generally not be so high that an essential part of the density can be said to relate to added materials.

When producing the mineral fiberboards, according to the invention, the first method will be to determine the position of the interval set forth above with respect to the mineral fiber to be used. An estimation of the pressure which has to be used for the pressing operation is then made in order that the final board may obtain the desired density without any crushing taking place. In this connection, it is mainly the pressing pressure that determines the density obtained. However, the density will, of course, also to some extent be influenced by the properties of the wet matt which may in turn be influenced by varying the fiber length and the concentration of the fiber suspension.

The invention will now further be described by way of examples.

Example 1

A hydropulper is charged continuously such that

| | Kg. |
|---|---|
| Water | 100,000 |
| Mineral fiber wool | 1,500 |
| Potato starch | 120 |
| Zinc stearate | 1.5 | are fed in per hour.

The pH-value of the suspension obtained is adjusted to 4.5 by adding potassium aluminium sulphate thereto. A hydropulper which has a perforated plate in the lower part thereof, the perforations consisting of apertures having a diameter of 25 mm., is connected to the inlet box of a wet machine which is part of an arrangement for the manufacture of hard wood fiber-board by a duct containing a pump. The suspension is transported from the hydropulper while passing through the apertures to the inlet box. The fibers are shaped into a wet matt which is, after cutting, carried onto one or more wires resting on transport plates. The wet matt obtained has a thickness of 16 mm. The sheets cut off from the matt are now each subjected to pressing, using successively increasing pressures while resting on their transport plates. After determining the crushed pressure, it is estimated that by applying a pressure within the limits of from 6 to 8 kg./cm.$^2$, a mineral fiberboard having a density of 0.95 gram per cubic centimeter will be obtained. The cut off portions of the wet matt resting on wires and transport plates are then introduced into the wall-board press and are pressed at 6-8 kg./cm.$^2$ for about 25 min. to form a mineral fiberboard having a thickness of about 8 mm. and a density of 0.90 gram per cubic centimeter. The latter presents excellent strength as well as fire-proof properties. When directing a burning flame towards a mineral fiberboard, the latter will undergo a strong swelling localized to the exposed spot. The swelling obtained was about 100 percent.

Example 2

In the hydropulper stated in Example 1, the following are introduced hourly:

| | Kg. |
|---|---|
| Water | 100,000 |
| Mineral fibers | 1,500 |
| Potato flour | 60 |

After adjusting pH to a value of 5.0 by adding potassium aluminium sulfate to the fiber suspension, the fibers are shaped into a wet matt in the same manner as in Example 1. There is applied to the surface of the wet matt 100 kg. of urea resin as an aqueous 30 percent solution.

The sheets cut off are then pressed at 6-8 kg./cm.$^2$ for 25 min. to obtain fiberboard having excellent properties.

Example 3

In the hydropulper stated in Example 1, the following are introduced hourly,

| | Kg. |
|---|---|
| Water | 100,000 |
| Mineral fibers | 1,500 |
| Corn starch | 160 |

After adjusting pH to a value of 5.0 by adding potassium aluminium sulfate to the fiber suspension, the fibers are shaped into a wet matt in the same manner as in Example 1.

The sheets cut off are then pressed at 6-8 kg./cm.$^2$ for 25 min. to obtain a fiberboard having excellent properties.

Example 4

In the hydropulper stated in Example 1, the following are introduced hourly,

| | Kg. |
|---|---|
| Water | 100,000 |
| Mineral fibers | 1,500 |
| Tapioca starch | 150 |

After adjusting pH to a value of 5.0 by adding potassium aluminium sulfate to the fiber suspension, the fibers are shaped into a wet matt in the same manner as in Example 1.

The sheets cut off are then pressured at 6–8 kg./cm.$^2$ for 25 min. to obtain a fiberboard having excellent properties.

Example 5

In the hydropulper stated in Example 1, the following are introduced hourly,

| | Kg. |
|---|---|
| Water | 100,000 |
| Mineral fibers | 2,000 |
| Potato flour | 160 |

After adjusting pH to a value of 6.0 by adding ammonium dihydro phosphate to the fiber suspension, the fibers are shaped into a wet matt containing 12 kg. of fibers per square meter in the same manner as in Example 1.

The sheets cut off are then pressed at 10 kg./cm.$^2$ for 35 min. the temperature of the pressing plates being in the range of from about 180 to 190° C., to obtain a fiberboard having a thickness of 12 mm.

The crushing pressure of the mineral fibers used here was determined to about 12–15 kg./cm.$^2$.

Example 6

In the hydropulper stated in Example 1, the following are introduced hourly,

| | Kg. |
|---|---|
| Water | 100,000 |
| Mineral fibers | 2,500 |
| Tapioca starch | 250 |

After adjusting pH to a value of 5.5 by adding sulfuric acid to the fiber suspension, the fibers are shaped into a wet matt containing 20 kg. of fibers per square meter in the same manner as in Example 1.

The sheets cut off are then pressed at 4 kg./cm.$^2$ for 90 min., the temperature of the pressing plates being about 170° C., to obtain a fiberboard having a thickness of 25 mm.

The crushing pressure of the mineral fibers used here was determined to about 10–12 kg./cm.$^2$.

Example 7

In the hydropulper stated in Example 1, the following are introduced hourly,

| | Kg. |
|---|---|
| Water | 100,000 |
| Mineral fibers | 900 |
| Potato flour | 100 |

After adjusting pH to a value of 5.5 by adding aluminium sulfate to the fiber suspension, the fibers are shaped into a wet matt containing 4 kg. of fibers per square meter in the same manner as in Example 1.

The sheets cut off are then pressed at 12 kg./cm.$^2$ for 15 min., the temperature of the pressing plates being 215° C., to obtain a fiber board having a thickness of 3.5 mm.

The crushing pressure of the mineral fibers used here was determined to about 15–17 kg./cm.$^2$.

Example 8

In the hydropulper stated in Example 1, the following are introduced hourly,

| | Kg. |
|---|---|
| Water | 100,000 |
| Mineral fibers | 1,500 |
| Corn starch | 140 |
| Paraffin wax | 2.5 |

The paraffin wax was added as an aqueous 50 percent emulsion of the wax.

After adjusting the pH to a value of 5.5 by adding aluminium sulfate to the fiber suspension, the fibers are shaped into a wet matt containing 6 kg. of fibers per square meter in the same manner as set forth in Example 1.

The sheets cut off are then pressed at 6 kg./cm.$^2$ for 25 min., the temperature of the pressing plates being about 170° C., to obtain a fiber board having a thickness of 3.5 mm.

The crushing pressure of the mineral fibers used here was determined to about 15–17 kg./cm.$^2$.

Example 9

In the hydropulper set forth in Example 1, the following are introduced hourly,

| | Kg. |
|---|---|
| Water | 100,000 |
| Mineral fibers | 1,800 |
| Corn starch | 200 |
| Paraffin wax | 4 |

The wax was added as an aqueous 50 percent emulsion of the wax.

After adjusting the pH to a value of 5.5 by adding aluminium sulfate to the fiber suspension, the fibers are shaped into a wet matt containing 18 kg. of fibers per square meter in the same manner as set forth in Example 1.

The sheets cut off are then pressed at 3 kg./cm.$^2$ for 40 min., the temperature of the pressing plates being maintained at about 190° C., to obtain a fiber board having a thickness of 24 mm.

The crushing pressure of the mineral fibers used here was determined to about 10–12 kg./cm.$^2$.

Example 10

In the hydropulper set forth in Example 1, with the exception that the perforated plate in the lower part thereof had been replaced by one having apertures having a diameter of 10 mm. to attain a tighter fiber product, the following are introduced hourly,

| | Kg. |
|---|---|
| Water | 100,000 |
| Mineral fibers | 1,400 |
| Potato starch | 140 |
| Wax | 3 |

The wax was added as an aqueous 50 percent emulsion thereof.

After adjusting the pH to a value of 6.8 by adding aluminium sulfate to the fiber suspension, the fibers are shaped into a wet matt containing 10 kg. of fibers per square meter in the same manner as set forth in Example 1.

The sheets cut off are then pressed at 8 kg./cm.$^2$ for 35 min., the temperature of the pressing plates being maintained at about 200° C., to obtain a fiberboard having a thickness of 9.5 mm.

The crushing pressure of the mineral fibers used was determined to 15–17 kg./cm.$^2$.

What I claim is:

1. A method for the production of a fire-resistant, felted, synthetic, mineral fiberboard comprising
    (a) mixing synthetic mineral fibers, and water and 6–12 percent of ungelatinized starch, based on the weight of the fibers, to form an aqueous 0.4 to 2.5 percent suspension of said fibers and said ungelatinized starch;
    (b) adjusting the pH of the mixture to a value in the range of from about 4.2 to 6.9;
    (c) forming said mixture into a wet matt;
    (d) cutting said wet matt into sheets;
    (e) subjecting test sheets of said mineral fibers to pressure of varying height to determine in which range of pressure fiber crushing takes place; and (f) applying a pressure below said range of pressure for a period in the range of from 10 to 120 min. by pressing means, the temperature of which being maintained at a value in the range of from 140 to 220° C., while simultaneously drying said matt to effect gelatinization of said starch and thus fixation of said fibers, said pressure being sufficient to produce a dried board having a density between about 0.5 to 1.1 g. per cc.

2. A method as claimed in claim 1, wherein the applied pressure is sufficient to produce a dried board having a density between about 0.7 to 1.0 g. per cc.

3. A fire-resistant, felted, synthetic, mineral fiberboard formed by
- (a) mixing synthetic mineral fibers, water and 6–12% of ungelatinized starch, based on the weight of the fibers, to form an aqueous 0.4 to 2.5% suspension of said fibers and said ungelatinized starch;
- (b) adjusting the pH of the mixture to a value in the range of from about 4.2 to 6.9;
- (c) forming said mixture into a wet matt;
- (d) cutting said wet matt into sheets;
- (e) subjecting test sheets of said mineral fibers to pressures of varying height to determine in which range of pressure fiber crushing takes place; and
- (f) applying a pressure below said range of pressure for a period in the range of from 10 to 120 minutes by pressing means, the temperature of which being maintained at a value in the range of from 140° to 220° C., while simultaneously drying said matt to effect gelatinization of said starch and thus fixation of said fibers, said pressure being sufficient to produce a dried board having a density between about 0.5 to 1.1 g. per cc.

4. A fiberboard in accordance with claim 3 wherein the applied pressure is sufficient to produce a dried board having a density between about 0.7 and 1.0 g. per cc.

References Cited

UNITED STATES PATENTS

| | | | |
|---|---|---|---|
| 1,426,163 | 8/1922 | Emrick | 162—152 |
| 1,865,049 | 6/1932 | Shaver | 162—152 |
| 2,103,318 | 12/1937 | Clapp | 162—152 X |
| 2,225,100 | 12/1940 | Clapp | 162—152 X |
| 2,698,788 | 1/1955 | Greenman | 162—155 X |

S. LEON BASHORE, *Acting Primary Examiner.*

HOWARD R. CAINE, *Examiner.*